Sept. 14, 1948.　　　　C. N. RYAN　　　2,449,146
AUTO WRECKING CRANE

Filed Jan. 28, 1947　　　　　　　　2 Sheets-Sheet 1

Inventor
CLARENCE N. RYAN,
By McMorrow, Berman & Davidson
Attorneys

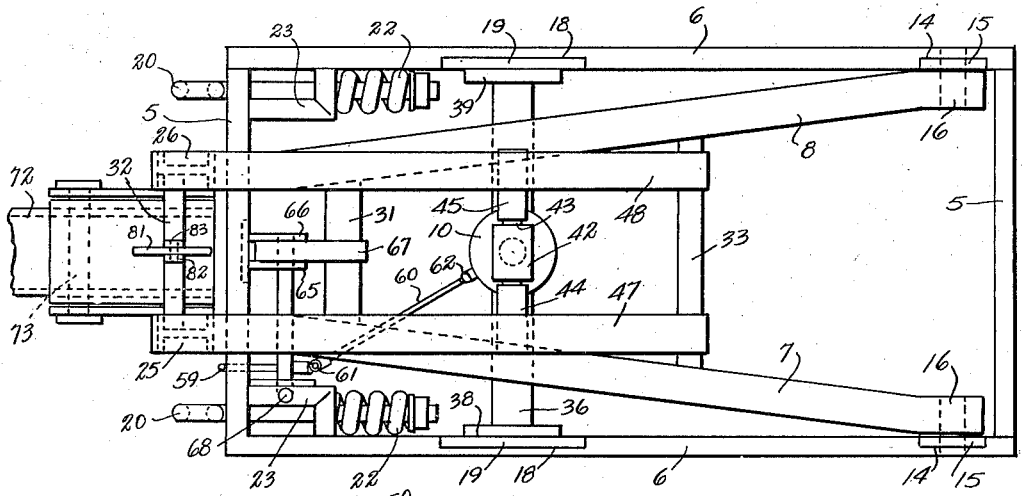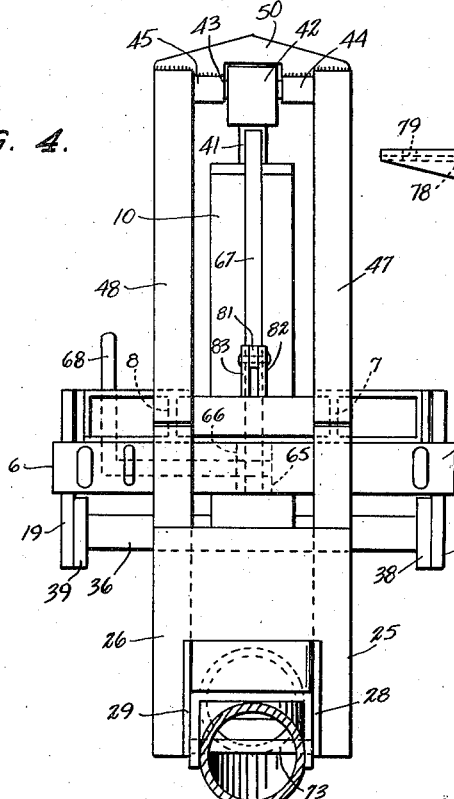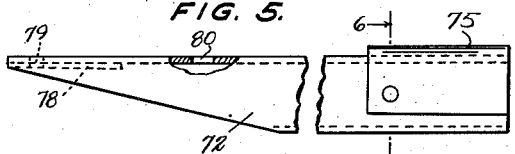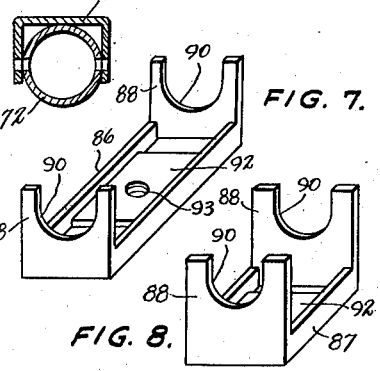

Patented Sept. 14, 1948

2,449,146

UNITED STATES PATENT OFFICE 2,449,146

AUTO WRECKING CRANE

Clarence N. Ryan, Washington, D. C.

Application January 28, 1947, Serial No. 724,753

2 Claims. (Cl. 214—86)

This invention relates to an auto-wrecking crane, and more particularly a fabricated crane structure adapted to be applied to the frame of a vehicle for the purpose of converting the same into a wrecking truck or vehicle-pulling car.

The invention has for its chief object the provision of an auto-wrecking crane fabricated from standard steel shapes and other materials, preferably by welding, whereby the employment of complicated special parts is substantially eliminated, thus effecting a great saving in the cost of construction and making it possible to adapt the crane to any convenient vehicle which it may be desired to convert into a wrecking truck or towing car.

Another object of the invention is the provision of a wrecking crane of simple design and rugged structure having no cables or other winding mechanism requiring frequent overhauling and attention to keep the same in proper repair and working order, and having instead a simple hydraulic lifting means of simple design not likely to become damaged by long exposure to the weather or by the rough usage to which such a structure is likely to be subjected.

A further object of the invention is to provide a compact and ruggedly constructed wrecking crane particularly suited for mounting upon the frame of any convenient motor vehicle, and so designed as to be readily modified to fit any size or type of vehicle frame which it is desired to adapt for use as a wrecking truck.

To the accomplishment of the foregoing and other objects, the invention, briefly stated, consists of a frame of generally rectangular configuration adapted to be supported on a vehicle frame and having a lifting frame pivotally associated therewith which is combined with hydraulic means for raising and lowering the lifting frame by swinging the same about its pivotal connection.

The invention will best be understood from the following description, constituting a specification of the same, taken in conjunction with the annexed drawings, wherein:

Figure 3 is a plan view of the invention, looking down on the crane as seen in Figure 2;

Figure 4 is a rear elevational view of the crane as seen from the left of Figure 2;

Figure 5 is a side elevational view showing the details of construction of the boom used with the crane;

Figure 6 is a cross-sectional view of the boom taken along the line 6—6 of Figure 5, looking in the direction indicated by the arrows;

Figure 7 is a perspective view of one form of axle bracket for application to the free end of the boom of the crane for use in lifting an automobile, and Figure 8 is a perspective view of a second form of axle bracket for use in the same manner as the bracket shown by Figure 7.

Figure 1:
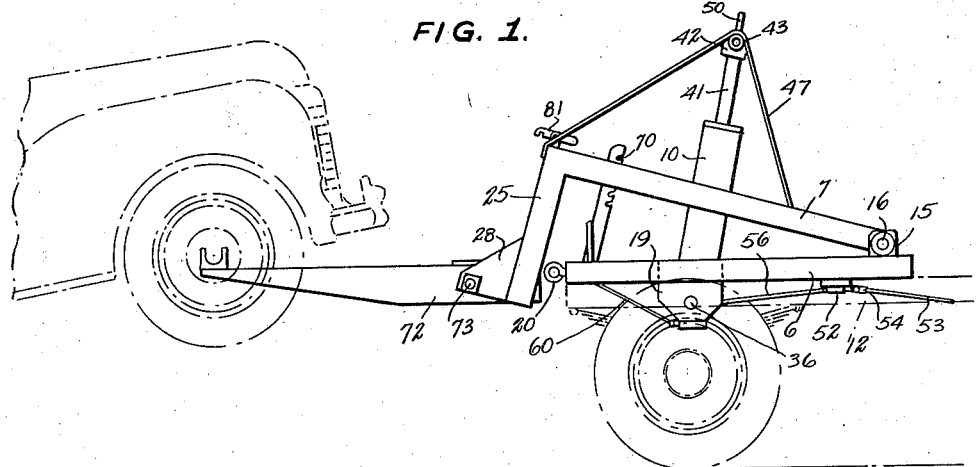
Figure 1 is a side elevational view of the invention, as applied to the frame of a motor vehicle, and illustrating the manner in which the invention is employed in lifting and towing an automobile.

Referring to the drawings in greater detail, the invention comprises a unitary crane structure adapted for mounting on a vehicle frame and consisting of a generally rectangular frame made up of the end members 5 and side members 6, and a pivotal lifting frame carried by the rectangular frame and made up of the I-beam members 7 and 8 adapted to be raised and lowered through the medium of an hydraulic cylinder 10.

The rectangular frame is preferably constructed by welding together the members 5 and 6, which may conveniently be in the form of steel channels, and is adapted to be secured to the frame of a vehicle indicated by 12 in Figure 1. The rectangular frame may, of course, be made in any convenient size and may be readily adjusted to fit any particular vehicle frame upon which it is to be mounted.

Figure 2:
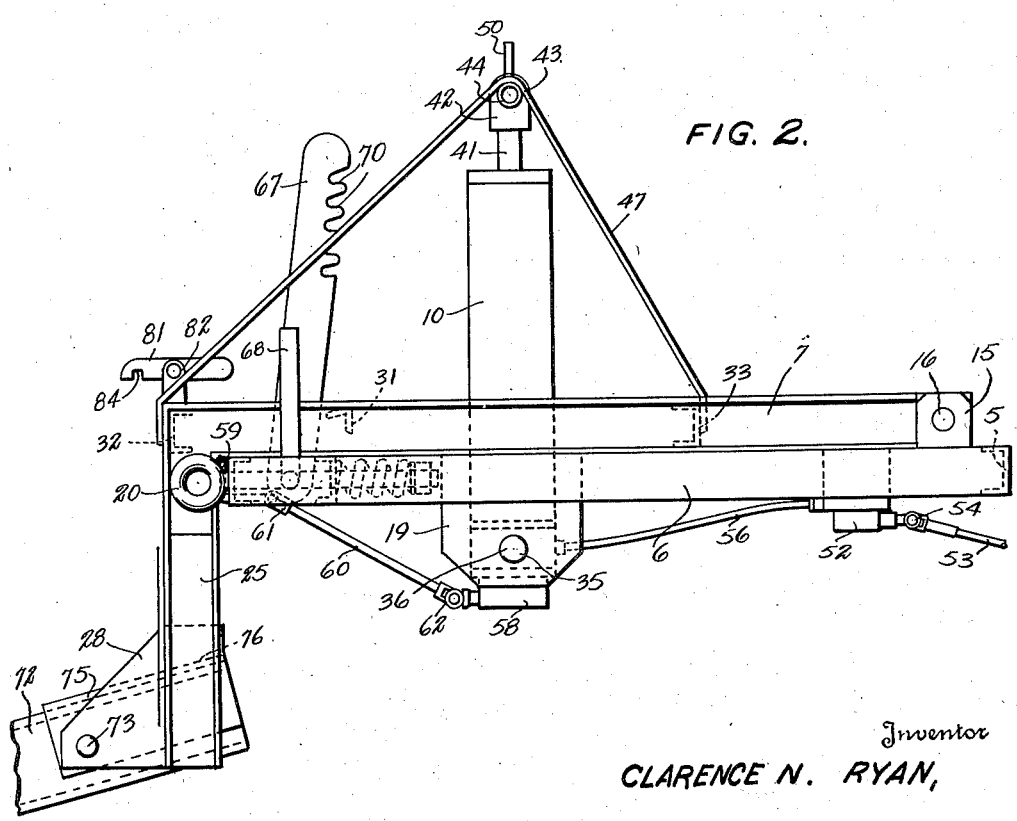
Figure 2 is a side elevational view of the invention, showing the various parts of the same assembled as a unit and separate from the vehicle frame to which the unit is applied.

The members 6 are notched out, as indicated at 14, near one end of the frame, to accommodate flat plates welded within the recesses and then extending upwardly above the members 6, as best seen in Figures 1 and 2. The flat plates 15 are apertured above the members 6 to accommodate pins 16 by which the lifting frame is pivoted to the rectangular frame. The members 6 are also provided with notched-out portions 18 mediate the length of the frame for the accommodation of downwardly extending flat plates 19. At the rear end of the rectangular frame eye-bolts 20 pass through apertures in the members 5 and extend within the rectangular frame, where they are provided with coil springs 22 bearing upon angles 23 welded within the corners of the rectangular frame.

The members 7 and 8 of the lifting frame converge slightly toward the rear end of the crane and extend downwardly beyond the rear end of the rectangular frame. The downwardly extending portions 25 and 26 of the lifting frame are notched out at their lower ends, as best seen in Figure 4 of the drawings, for the reception of flat plates 28 and 29, for a purpose later to be made apparent. The members 7 and 8 of the lifting frame are preferably fashioned of I-beam steel, and at their forward ends are provided with apertures for the reception of the pivot pin 16. In the region of the pivot pin 16, the members 7 and 8 are preferably bent into parallelism with the members 6 of the rectangular frame to provide a close fit of the lifting frame with the rectangular frame at the pivotal points of support. Braces 31 and 32 are provided, joining the members 7 and 8 near the rear end of the lifting frame. A brace 33 is also positioned between the members 7 and 8 mediate the ends of the lifting frame.

The downwardly extending plates 19 of the rectangular frame are provided with apertures 35 for the reception of a pivot pin 36 extending entirely across the width of the rectangular frame. Reinforcing plates 38 and 39 are provided upon the apertured portion of the downwardly extending plates 19.

The pivot pin 36 supports the lower end of the hydraulic cylinder 10 centrally between the members 6 of the rectangular frame. A piston rod 41 extends upwardly from the hydraulic piston 10 and is connected at its upper end to a bearing 42, which is supported on a pivot pin 43 passing through bearings 44 and 45 arranged on opposite ends of the pivot pin. The bearings 44 and 45 are secured to strap-like members 47 and 48, respectively, which extend from the brace 33 upwardly over the bearings 44 and 45 and downwardly to engage the upper ends of the portions 25 and 26 of the rear end of the lifting frame. A flat plate 50 extends over the top of the bearings 44 and 45 and the members 47 and 48 and is welded thereto serve as a reinforcing element in securing the bearings 44 and 45 to the strap-like members 47 and 48. The plate 50 is notched out to receive the bearing 42 in order that the same may rotate freely upon the pin 43.

A fluid pump 52 is supported on the rectangular frame, as seen in Figure 2, and is adapted to be driven from any suitable source of power through the rod 53 and universal joint 54. The fluid pump 52 is connected to the bottom end of the hydraulic cylinder through a connecting pipe 56. The flow of fluid to and from the hydraulic cylinder 10 is controlled by means of a valve 58 which is adapted to be operated by a hand lever 59 effective through the connecting rod 60 and universal joints 61 and 62.

A pair of apertured lugs 65 and 66 extend inwardly of the rear end of the rectangular frame for the support of a notched element 67 extending upwardly from the rectangular frame and operable by a hand lever 68. The element 67 has notches 70 arranged along one vertical edge for the reception of the end of the angle brace 31 of the lifting frame to maintain the lifting frame in elevated position, as best seen in Figure 1. Upon elevation of the lifting frame, the brace 31 engages in a notch 70, thus maintaining the lifting frame in elevated position, and upon operation of the hand lever 68 the element 70 can be released from the lifting frame when it is desired to lower the same upon the rectangular frame.

A boom 72, best seen in Figure 5, is pivotally supported at one end by a pin 73 passing through apertures in the plates 28 and 29 secured to the lower ends of the vertical portions 25 and 26 of the lifting frame. At its pivoted end the boom 72 is provided with a channel-shaped member 75 which offers flat surfaces for engagement with the plates 28 and 29, and a flat upper surface adapted to engage an angle-shaped element 76 extending between the vertical portions 25 and 26 of the lifting frame to act as a limiting stop for the downward movement of the boom, as will best be seen in Figure 2.

The rear end of the boom 72 is somewhat tapered, and a reinforcing plate 78 is secured inside of the same to provide a seating portion for an axle bracket which is adapted to be seated on the free end of the boom and secured thereto by a pin extending through an aperture 79. An aperture 80 is provided mediate the ends of the boom, into which a latch 81 pivoted between upstanding lugs 82 and 83 on the rear end of the lifting frame is adapted to extend. The latch 81 is provided with a notch 84 for engagement with the wall of the boom to latch the same in its extreme upward position when the crane is out of use.

The lifting axle brackets seen in Figures 7 and 8 may be made in varying lengths, and are preferably formed of channel sections 86 and 87, provided at the ends with upstanding plates 88 having U-shaped notches 90. Inside the bottom of each of the axle brackets a plate 92 is secured, which serves as a reinforcement about the aperture 93 in the bottom of the bracket. The brackets are adapted to be seated upon the free end of the boom 72 and secured in place thereon by a pin extending through the aperture 93 and the aperture 79 of the boom. The notches 90 are adapted to receive the axle of an automobile which is to be lifted by the crane. It will be apparent that different lengths of axle brackets may be provided to accommodate vehicles of different widths in order to assure proper balancing and secure connections with such vehicles when the same are to be lifted and towed by the crane.

In operation of the above-described auto-wrecking crane, the lifting frame is first lowered upon the rectangular frame and the boom 72 is raised to its extreme elevated position and latched in place by the latch 81. The vehicle carrying the wrecking crane is then moved to the location in which it is to be employed for lifting or towing another vehicle, and the boom 72 is lowered by releasing the latch 81, so that the boom occupies a slightly downwardly sloping position, as will best be seen in Figure 2. The crane is then moved back until the free end of the boom carrying an axle bracket is positioned beneath the axle of an automobile which it is desired to lift. Upon operation of the hydraulic pump 52, which may be conveniently operated from the engine of the wreck truck, the valve 58 may be moved by the hand lever 59 to permit oil or other suitable hydraulic medium to be pumped into the lower end of the hydraulic cylinder 10. In this manner the piston rod 41 of the hydraulic cylinder 10 is extended upwardly, carrying with it the lifting frame by the strap-like members 47 and 48. Upward movement of the piston rod 41 causes the lifting frame to be pivoted about the pin 16, thus raising the boom 72 and lifting therewith the vehicle which it is desired to tow. As soon as the lifting frame has reached the desired elevated position, the element 67 is brought into engagement with the angle brace 31 to maintain the lifting frame securely in position.

Chains, cables or other convenient securing means may be connected to the eye-bolts 20 and to the vehicle to be towed, to assure that the same will be maintained securely in position on the boom. Once the lifting frame has been elevated to the desired position and secured therein by the element 67, the fluid pressure in the hydraulic cylinder can be released, thus making it unnecessary to maintain the hydraulic pressure in the piston while towing away an automobile. Upon reaching the destination, the pump 52 may again be brought into operation and the lifting frame elevated slightly to enable the element 67 to be easily released, whereupon by suitable operation of the valve 58 through the hand lever 59, the lifting frame may again be lowered upon the rectangular frame, thus releasing the boom from the vehicle being towed.

It will readily be apparent from the above description that the auto-wrecking crane can be fabricated as a unit in any desired size, and employing whatever suitable materials may be at hand, so that the invention provides a means by which vehicles of all kinds can be readily converted for use as wrecking trucks or towing cars. The structure described is well suited for fabrication by the extensive use of welding, which makes it possible to utilize readily axailable materials, thus eliminating the expense of providing specially constructed parts or obtaining unusual shapes or sizes of materials. Such wrecking crane unit can be readily manufactured in standard sizes for application to the frames of trucks or other vehicles of standard dimensions, or the unit can be built to fit any particular vehicle frame regardless of the dimensions or the particular use to which the unit is to be applied.

It will, of course, be understood that the foregoing detailed description of the invention is given merely by way of exemplification, and that many changes in the construction and arrangement of the various parts may be made without departing from the spirit of the invention or the scope of the appended claims.

Having thus clearly shown and described the invention, what is claimed as new and desired to secure by Letters Patent is:

1. In a unitary crane structure adapted to be carried on the rear end of a vehicle chassis including a lifting frame pivotally mounted at the forward end thereof and extending downwardly at the rear end, a load-engaging boom attached to the downwardly-extending free end of the lifting frame, a hydrau'ic power-transmitting device comprising a hydraulic cylinder carried upon said chassis having an upwardly-directed piston for raising the lifting frame, and means for supplying fluid under pressure to the hydraulic cylinder, the features which include a substantially rectangular supporting frame adapted to be directly mounted upon the chassis having a pair of pivot mountings at the forward end thereof to which the forward end of the lifting frame is pivoted and a pair of downwardly-pendent plates fixed within the sides of the supporting frame intermediate the forward and rear ends thereof, a transverse pivot shaft supported at the ends thereof in said pendent plates and supporting the lower end of said hydraulic cylinder intermediate said plates, the supporting frame except the downwardly-extending portion thereof being of substantially the same length as that of the lifting frame and the latter lying horizontally upon said supporting frame in normal lowered idle position thereof, at least one intermediately upwardly-peaked strap member connected at the lower rear end thereof to the rear end of said lifting frame and at the upper peak portion to the upper end of the hydraulic piston, a transverse brace fixed between the sides of said lifting frame intermediate the forward pivot end thereof and the transverse pivot shaft supporting the hydraulic cylinder, the lower forward end of said strap member being secured to the transverse brace, a second transverse brace fixed between the sides of said lifting frame intermediate said transverse pivot shaft and the rear end of the frame, an upwardly-directed movable supporting member pivotally mounted at the lower end thereof to the supporting frame intermediate said rear end of said supporting frame and the second transverse brace and having a series of notches in the upwardly-extending forward edge thereof adapted to be individually engaged by said second transverse brace to determine various positions of said lifting frame on its forward pivot mounting, and a manually-operated handle rigidly connected to said upwardly-directed movable supporting member for engaging the latter with and disengaging from said second transverse brace at will.

2. In a unitary crane structure adapted to be carried on the rear end of a vehicle chassis including a lifting frame pivotally mounted at the forward end thereof and extending downwardly at the rear end, a load-engaging boom attached to the downwardly-extending free end of the lifting frame, a hydraulic power-transmitting device comprising a hydraulic cylinder carried upon said chassis having an upwardly-directed piston for raising the lifting frame and means for supplying fluid under pressure to the hydraulic cylinder, the features which include a substantially rectangular supporting frame adapted to be directly mounted upon the chassis, having a pair of pivot mountings at the forward end thereof to which the forward end of the lifting frame is pivoted and a pair of downwardly-pendent plates fixed within the sides of the supporting frame intermediate the forward and rear ends thereof, a transverse pivot shaft supported at the ends thereof in said pendent plates and supporting the lower end of said hydraulic cylinder intermediate said plates, the supporting frame except the downwardly-extending portion thereof being of substantially the same length as that of the lifting frame and the latter lying horizontally upon said supporting frame in normal lowered idle position thereof, a pair of intermediately upwardly-peaked strap members secured at the lower rear ends thereof to the rear of said lifting frame, a bearing fixed upon the upper end of the hydraulic piston, a pair of bearings secured to the upper intermediate peak portions of the strap members at both sides of and in line with the first-mentioned bearing, a reinforcing plate secured transversely of said strap members to said pair of bearings and said peak portions of the strap members and clearing said first-mentioned bearing, a pivot pin extending through all three bearings, a transverse brace fixed between the sides of said lifting frame intermediate the forward pivoted end thereof and the transverse pivot shaft supporting the hydraulic cylinder, the lower forward ends of said strap members being secured to the transverse brace, a second transverse brace fixed between the sides of said lifting frame intermediate said transverse pivot shaft and the rear end of the frame, an upwardly-directed movable supporting member pivotally mounted at the lower end thereof to the supporting frame intermediate said rear end of said supporting frame and the second transverse brace and having a series of notches in the upwardly-extending forward edge thereof adapted to be individually engaged by said second transverse brace to determine various raised positions of said lifting frame on its forward pivot mounting, and a manually-operated handle rigidly connected to said upwardly-directed movable supporting member for engaging the latter with and disengaging it from said second transverse brace at will.

CLARENCE N. RYAN.

REFERENCES CITED

The following references are of record in the file of this patent:

UNITED STATES PATENTS

| Number | Name | Date |
|---|---|---|
| 1,821,798 | Goss | Sept. 1, 1931 |
| 2,197,406 | Fleming et al. | Apr. 16, 1940 |
| 2,418,251 | Drott | Apr. 1, 1947 |

FOREIGN PATENTS

| Number | Country | Date |
|---|---|---|
| 271,184 | Great Britain | May 26, 1927 |